(12) United States Patent
Östling et al.

(10) Patent No.: US 8,532,881 B2
(45) Date of Patent: Sep. 10, 2013

(54) CONNECTING DEVICE ARRANGED IN A MOTOR VEHICLE AND A METHOD FOR CONTROLLING THE SAME

(75) Inventors: Martin Östling, Brämhult (SE); Mikael Fermer, Partille (SE); Henrik Ljungqvist, Torslanda (SE); Henrik Ebbinger, Göteborg (SE); Henrik Olsson, Torslanda (SE)

(73) Assignee: Autoliv Development AB, Vargarda (SE)

( * ) Notice: Subject to any disclaimer, the term of this patent is extended or adjusted under 35 U.S.C. 154(b) by 867 days.

(21) Appl. No.: 12/498,588

(22) Filed: Jul. 7, 2009

(65) Prior Publication Data

US 2010/0004826 A1    Jan. 7, 2010

(30) Foreign Application Priority Data

Jul. 7, 2008 (EP) ..................................... 08159843

(51) Int. Cl.
*B60R 21/00* (2006.01)
(52) U.S. Cl.
USPC ............... 701/45; 701/36; 180/271; 180/282; 180/289; 296/187.03; 296/187.06; 296/190.01; 296/190.04; 296/190.05
(58) Field of Classification Search
None
See application file for complete search history.

(56) References Cited

U.S. PATENT DOCUMENTS

| | | | |
|---|---|---|---|
| 2,421,807 A | 6/1947 | Richey et al. | |
| 2,871,750 A | 2/1959 | Charles | |
| 3,204,515 A * | 9/1965 | Dickie et al. | 411/434 |
| 3,331,278 A * | 7/1967 | Brown | 89/1.1 |
| 3,675,533 A * | 7/1972 | Gawlick et al. | 89/1.14 |
| 4,050,537 A * | 9/1977 | Bez | 180/274 |
| 4,410,293 A * | 10/1983 | Elias et al. | 403/24 |
| 4,929,135 A * | 5/1990 | Delarue et al. | 411/354 |
| 5,671,650 A * | 9/1997 | Aubret | 89/1.14 |
| 5,727,815 A * | 3/1998 | Smith | 280/784 |
| 5,779,264 A | 7/1998 | Mersseman | |
| 6,113,178 A * | 9/2000 | Faigle | 296/187.06 |
| 6,409,253 B2 * | 6/2002 | Larsson et al. | 296/187.09 |
| 6,420,803 B1 * | 7/2002 | Woodall et al. | 307/121 |
| 7,461,859 B2 * | 12/2008 | Fogle et al. | 280/739 |
| 7,862,282 B2 * | 1/2011 | Smith et al. | 411/434 |
| 7,926,609 B2 * | 4/2011 | Kusaka | 180/232 |
| 8,016,332 B1 * | 9/2011 | Shoap | 293/132 |
| 2003/0105569 A1 | 6/2003 | Roelleke | |

(Continued)

FOREIGN PATENT DOCUMENTS

DE       11 84 157 B     12/1964
DE    10 2004 014626 A1   7/2005

OTHER PUBLICATIONS

European Search Report for EP 08159843.5, SA/EP, Munich, completed Nov. 28, 2008.

*Primary Examiner* — Jonathan M Dager
(74) *Attorney, Agent, or Firm* — Harness, Dickey & Pierce, P.L.C.

(57) ABSTRACT

A connecting device arranged in a motor vehicle releasably connects a structural member of the vehicle to the vehicle chassis and includes a bolt joint system. The connecting device further includes a pyrotechnical charge and an igniter. The igniter detonates the pyrotechnical charge upon receipt of an ignition signal. The pyrotechnical charge is located near the bolt joint system such that, upon detonation, it destroys the connecting function of the bolt joint system and thereby releases the structural member from the chassis.

24 Claims, 5 Drawing Sheets

(56) References Cited

U.S. PATENT DOCUMENTS

2004/0032149 A1* 2/2004 Ljungquist et al. ...... 296/187.03
2005/0035642 A1* 2/2005 Hake et al. .................... 297/396
2007/0274806 A1* 11/2007 Kanerva et al. ................ 411/391
2008/0011536 A1* 1/2008 Pipkorn et al. ................ 180/274
2012/0045291 A1 2/2012 Parks et al.

* cited by examiner

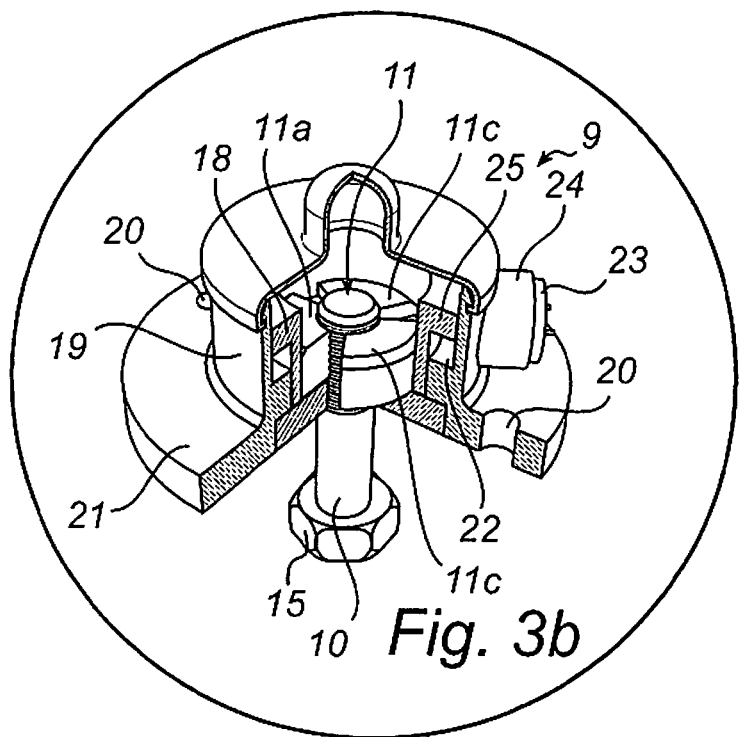
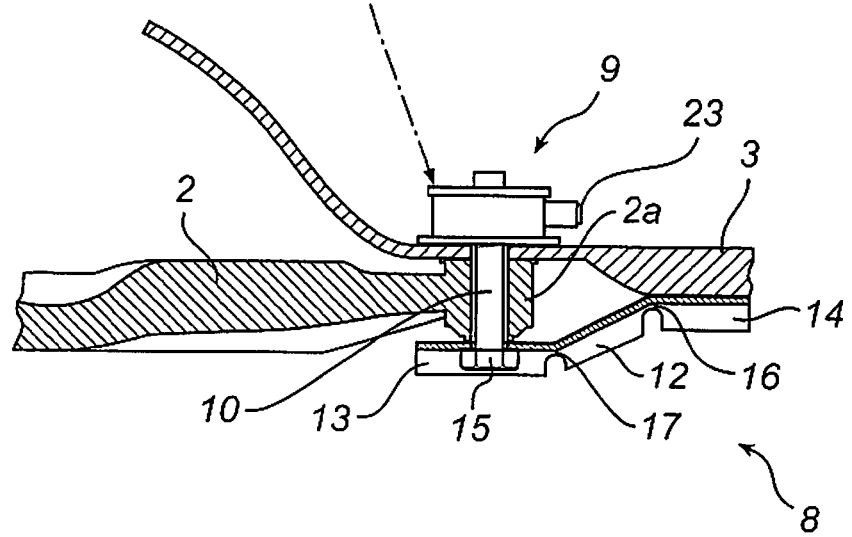
Fig. 3a
Fig. 3b

CONNECTING DEVICE ARRANGED IN A MOTOR VEHICLE AND A METHOD FOR CONTROLLING THE SAME

CROSS-REFERENCE TO RELATED APPLICATIONS

This application claims the benefit and priority of EP08159843.5, filed Jul. 7, 2008. The entire disclosure of the above application is incorporated herein by reference.

FIELD

The present disclosure relates to a connecting device arranged in a motor vehicle for releasably connecting a structural member of the vehicle to the vehicle chassis, said connecting device comprising a bolt joint system.

The present disclosure further relates to a method for controlling a connecting device arranged in a motor vehicle for releasably connecting a structural member of the vehicle to the vehicle chassis.

BACKGROUND

This section provides background information related to the present disclosure which is not necessarily prior art.

In the design of motor vehicles the energy absorption characteristics of the vehicle structure during an impact event is an important consideration. During an impact event the vehicle occupants are subjected to crash loads that may cause severe injuries. Such crash loads are for instance the result of high acceleration during the impact event. The level of acceleration that the occupants are subjected to during an impact event is highly influenced by the stiffness of the vehicle structure. It is well known to define certain deformation zones that are adapted to absorb collision energy in order to reduce the acceleration levels experienced by the occupants and thereby reduce the risk of injuries to the occupants. By absorbing a substantial amount of collision energy the occupants are subjected to a lower acceleration during the impact event. A front subframe of a motor vehicle is normally fixed to the vehicle chassis by means of bolt joint connections.

One way of improving the occupant protection in certain crash scenarios is to release structural members during the crash. A connecting device of the above-mentioned type is known from JP-11348578 which discloses a releasable bracket device improving the shock absorbing ability of a vehicle. Two structures in the front end structure of the car are joined together by means of a bolt which is inserted in a bolt hole in the first structure and in an open and upward facing oblong hole in the second structure. When a certain crash force is exceeded in a collision the second structure is released from the first structure via a sliding movement of the bolt guided by the oblong hole. This solution has the drawback that it may result in insufficient degree of occupant protection in several crash scenarios.

SUMMARY

This section provides a general summary of the disclosure, and is not a comprehensive disclosure of its full scope or all of its features.

An object of the present disclosure is to provide a connecting device for connecting a structural member of a motor vehicle to the vehicle chassis to improve the occupant protection in a variety of crash scenarios.

This and other objects are achieved by a connecting device arranged in a motor vehicle for releasably connecting a structural member of the vehicle to the vehicle chassis, said connecting device comprising a bolt joint system. The connecting device is characterised in further comprising a pyrotechnical charge and an igniter, said igniter being adapted to, when receiving an ignition signal, bring said charge to detonate, said pyrotechnical charge being located near the bolt joint system such that it, upon detonation, destroys the connecting function of the bolt joint system, for releasing said structural member from the chassis.

Thus, an adaptively releasable connecting device for connecting a structural member to a chassis is provided. In certain crash scenarios, a reduced robustness of the vehicle structure is advantageous to improve the occupant protection since the collision energy may be absorbed in a more efficient manner by means of utilizing the deformation zones more efficiently.

When receiving an ignition signal, which is indicative of a predicted crash, the connecting function of the bolt joint system may thus be destroyed and consequently the structural member may be released from the chassis. The robustness of the vehicle front end structure is then reduced since the released structural member is no longer contributing to the front end structure stiffness. By reducing the robustness when it is advantageous, the acceleration experienced by an occupant in an impact event may be reduced and consequently the risk of injuries to the occupants may be reduced.

The bolt joint system preferably comprises a bolt, extending through a hole in said structural member and through a hole in the vehicle chassis, and a nut engaging said bolt, said nut being adapted to be destroyed by said pyrotechnical charge. Thus, a connecting device in which the parts connected to each other can be released in a robust and reliable manner is provided.

Preferably, the connecting device further comprises a pulling means, which is operable by crash forces, for pulling out said bolt from at least one of said holes in said structural member and in said vehicle chassis when the connecting function of the bolt joint system is destroyed. Thus, a robust and reliable connecting device that immediately pulls out the bolt when the nut is destroyed is provided.

The pulling means is preferably formed by a lever arm which at a first end thereof is fixed to said bolt and at a second end thereof is pivotally mounted to the chassis. Upon crash forces the lever arm forces the bolt out from at least one of the holes. Thus, a robust and reliable pulling means is provided. Crash forces thus acts to pull out the bolt from at least one of the holes.

Preferably, the lever arm has at least one weakened section to enable pivotal movement thereof.

Preferably, the nut consists of nut segments being retained in engagement with the bolt by means of a retaining collar. Thus, a robust and stable connection is provided. When receiving an ignition signal the collar is removed from the segmented nut by means of detonation of the pyrotechnical charge.

Preferably, the bolt joint system further comprises a housing in which said nut segments and said retaining collar are arranged, in order to provide a robust and reliable connecting device.

Preferably, a circumferential channel is formed between said retaining collar and said housing, said circumferential channel being in communication with said pyrotechnical charge. Thus, the segmented nut can be separated in a controllable and fast manner.

Preferably, the connecting device is arranged in a motor vehicle for releasably connecting a subframe, such as a front subframe or a rear subframe of the vehicle, to the vehicle chassis.

The pyrotechnical charge and the igniter preferably form part of an initiator device, such as a pyrotechnical squib, in order to provide a solution having few parts and that that is easy to assemble and mount in the vehicle. Furthermore, the use of such a squib provides ignition of the pyrotechnical charge in a fast and controllable manner.

Preferably, the ignition signal is received from a sensor system, such as an in-crash based sensor system or a pre-crash based sensor system.

A further object is to provide a method for controlling a connecting device connecting a structural member of the vehicle to the vehicle chassis.

This and other objects are achieved by a method for controlling a connecting device arranged in a motor vehicle for releasably connecting a structural member of the vehicle to the vehicle chassis, said connecting device comprising a bolt joint system. The method is characterised in that it comprises the steps of: generating, based on information from at least one crash sensor, a crash indication signal; comparing said crash indication signal to a first pre-determined value; and bringing, if the value of said crash indication signal is above said first pre-determined value, a pyrotechnical charge to detonate, said pyrotechnical charge being located near the bolt joint system such that it, upon detonation, destroys the connecting function of the connecting device.

Thus, a structural member may be adaptively released from a vehicle chassis in an impact event, which may result in improved occupant protection in a variety of crash scenarios where reduced robustness is advantageous.

Preferably the step of comparing said crash indication signal to a first pre-determined value further comprises comparing said crash indication signal also to a second pre-determined value and said step of bringing said pyrotechnical charge to detonate being carried out only if the value of said crash indication signal is above said first pre-determined value and below said second pre-determined value.

The crash indication signal is preferably related to the velocity of said vehicle.

Other objectives, features and advantages of the present disclosure will appear from the following detailed disclosure, from the attached dependent claims as well as from the drawings.

BRIEF DESCRIPTION OF THE DRAWINGS

The present disclosure will now be described in more detail with the reference to the accompanying schematic drawings which shows a preferred embodiment of the invention and in which:

FIG. 3a shows the connecting device in FIG. 2 in a partially sectioned view.

FIG. 3b shows a bolt joint system of the connecting device shown in FIG. 2 in a partially sectioned view.

Figure 1:
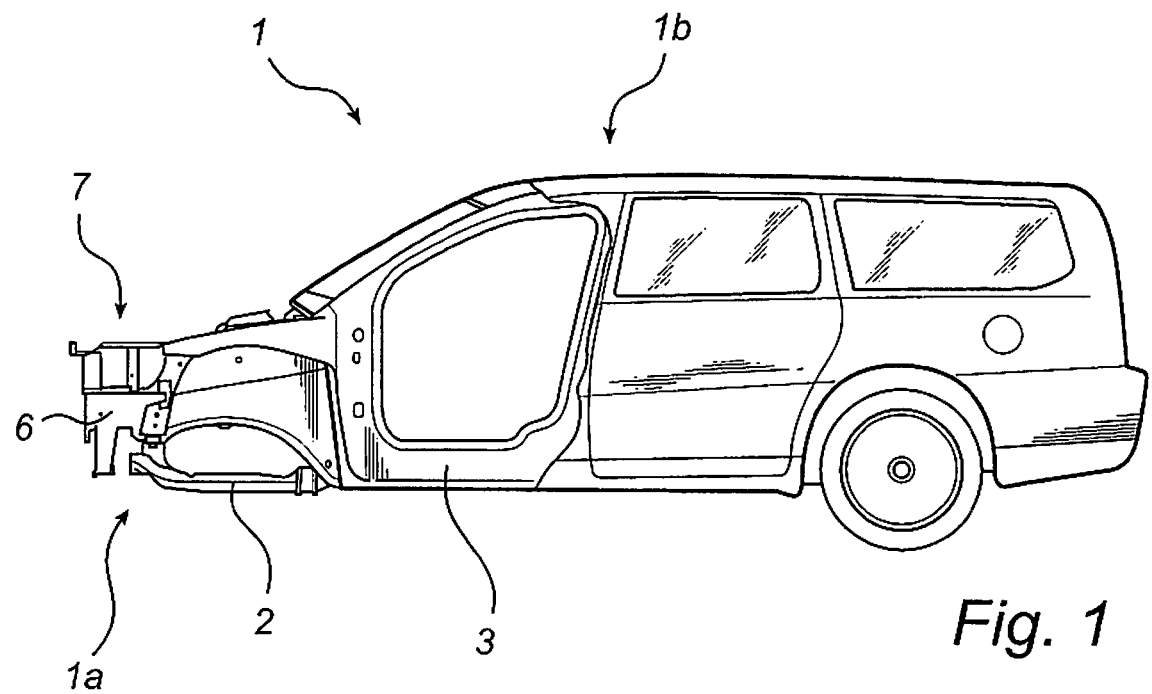
FIG. 1 is a side view of an exemplary vehicle structure in which a connecting device according to the present disclosure may be fitted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

TECHNICAL DESCRIPTION

FIG. 1 shows parts of a vehicle structure 1 in which an embodiment of the present disclosure may be fitted for releasably connecting the rear end of a front subframe 2 to a vehicle chassis 3. The vehicle structure 1 is a unit body construction. The front subframe 2, which forms part of a vehicle front structure 1a, comprises longitudinally and transversally extending structural members. Normally, the front subframe 2 is connected to the chassis 3 at four attachment points; two at a front end and two at a rear end of the front subframe 2. The vehicle front structure 1a further comprises collapsible structural members 6 adapted to form a deformation zone 7, in which collision energy is absorbed during an impact event.

Figure 2:
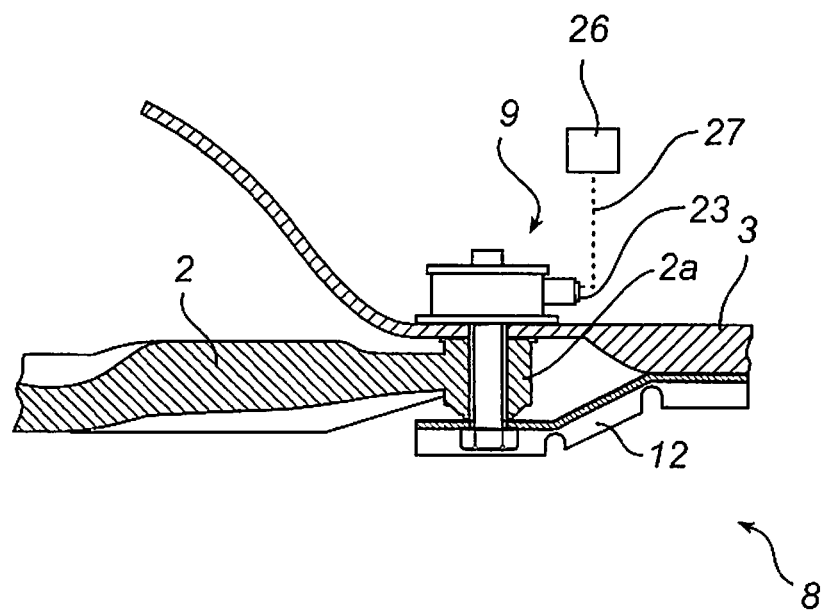
FIG. 2 shows a connecting device according to an embodiment of the present disclosure in a partially sectioned view.

FIG. 2 shows schematically the front subframe 2 of which a rear end 2a is connected to the vehicle chassis 3 by means of a connecting device 8 according to an embodiment of the present disclosure. The front subframe 2 may be connected to the chassis 3 using one or more connecting devices 8. In this case the rear end 2a of the front subframe 2 is connected to the chassis 3 using two parallel connecting devices 8. Each connecting device 8 comprises a bolt joint system 9, an initiator device 23 and a pulling means 12. Each squib 23 is connected to an electrical control unit 26 by means of a cable 27.

Figure 3C:
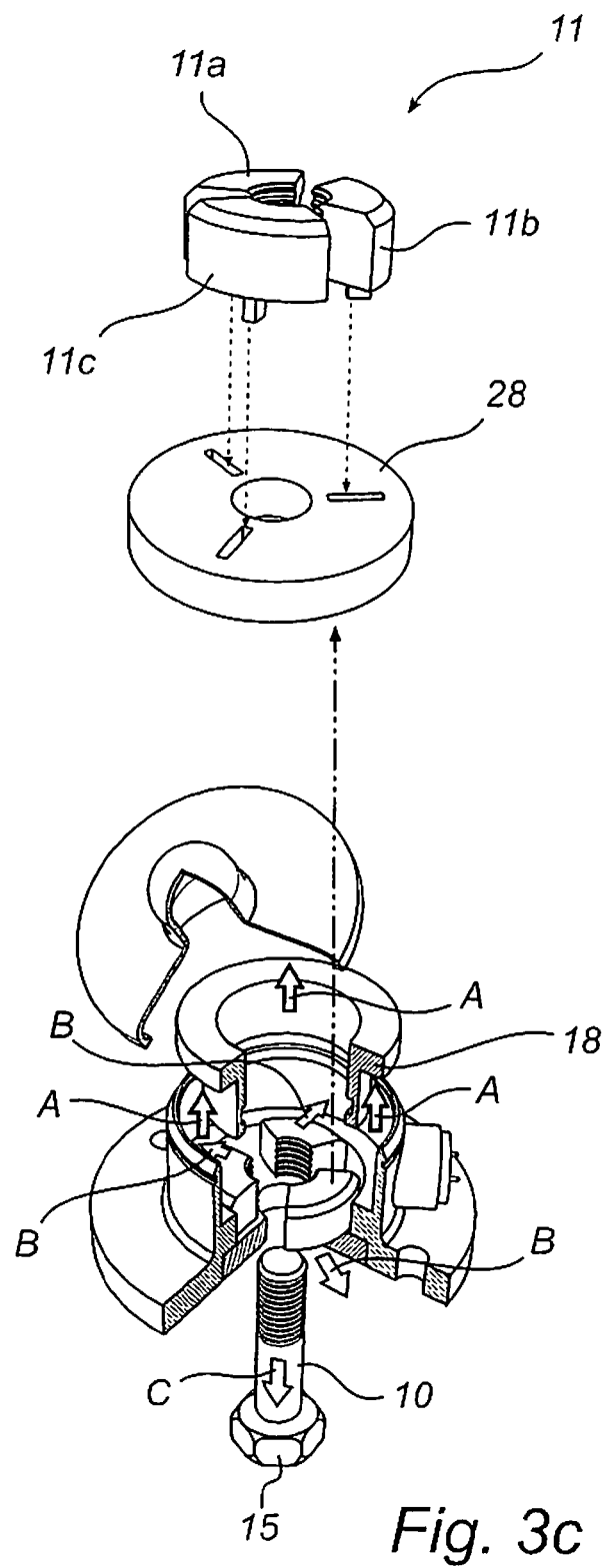
FIG. 3c illustrates the function of the bolt joint system shown in FIG. 3b.

FIG. 3a, 3b and 3c illustrate various aspects of the connecting device 8. The releasable bolt joint system 9 comprises a threaded bolt 10 and a nut 11 (not shown in FIG. 3a) having internal threads. The nut 11, which is shown in FIG. 3b and 3c, comprises three nut segments 11a, 11b, 11c. The bolt 10 extends through a sleeve, which forms part of the rear end 2a of the front subframe 2, and through a hole in the chassis 3, and is engaged with the segmented nut 11.

The pulling means, in this case a pivotable lever arm 12, is at a first end 13, in the form of a front end 13, thereof fixed to the bolt 10 and at a second end 14, in the form of a rear end 14, thereof mounted to the chassis 3. The rear end 14 of the lever arm 12 may be mounted to the chassis 3 by means of attachment means, such as bolt connections, screws, rivets or by welding. The front end 13 of the lever arm 12 is fixed to the rear end 2a of the subframe 2 by the bolt 10 which extends through a hole in the lever arm 12. A bolt head 15 of the bolt 10 holds the front end 13 of the lever arm 12 in position. Alternatively, a nut having internal threads engaging external threads of the bolt 10 may be used for holding the lever arm 12 in position. The lever arm 12 has a first weakened section 16 and a second weakened section 17 which are adapted to be deformed to enable the lever arm 12 to perform a pivotal movement upon crash forces when the nut segments 11a, 11b, 11c are separated. Once the nut 11 is destroyed the deformable lever arm 12 thus pivots and pulls out the bolt 10 by crash forces acting on the lever arm 12 via the bolt 10. The lever arm 12 thus serves to immediately pull out the bolt 10 from the chassis 3 when the connecting function of the bolt joint system 9 is destroyed.

The segmented nut 11 is retained by a retaining collar 18 arranged around the nut 11, as is best illustrated in FIG. 3b. The bolt joint system 9 further comprises a housing 19 in which the segmented nut 11 and the collar 18 are arranged. The housing 19 is attached to the vehicle chassis 3 by means of bolt connections where bolts (not shown) are extending through holes 20 in a bottom flange 21 of the housing 19. A circumferential channel 22 is formed between the retaining collar 18 and the housing 19.

The initiator device is in this case a pyrotechnical squib 23 of a type known in the art and comprising a pyrotechnical charge and an electrical igniter. Hence, the pyrotechnical squib 23 comprises both the pyrotechnical charge and the igniter. It will be appreciated that, as an alternative, the pyrotechnical charge and the igniter could be separate devices. The pyrotechnical squib 23 is located such that the retaining collar 18 is removed from the segmented nut 11 upon ignition of the squib 23. The squib 23 is received in a receiving portion 24 of the housing 19. In order to fasten the squib 23 it may have external threads that are engaged with internal threads of the receiving portion 24. The squib 23 is connected to a control unit 26 by means of a cable 27, as schematically illustrated in FIG. 2. The receiving portion 24, and thus the squib 23, is in communication with the circumferential channel 22 through an aperture in the housing 19.

Referring to FIG. 3b and FIG. 3c the function of the releasable bolt joint system 9 will now be described. Upon ignition of the squib 23 it produces a volume of gas at elevated pressure which is received in the circumferential channel 22. Due to elevated pressure inside the circumferential channel 22 a force is applied on the flange 25 of the collar 18, thereby causing the collar 18 to perform a movement away from the segmented nut 11, as indicated by arrows A in FIG. 3c. Movement of the nut segments 11a, 11b, 11c in a radial direction is then enabled. At this stage the bolt 10 is subjected to forces in a direction indicated by arrow C due to crash forces. The nut segments 11a, 11b, 11c are then separated from the bolt 10 by means of forces from the bolt 10, as illustrated by arrows B in FIG. 3c. As indicated in FIG. 3c the nut segments 11a, 11b, 11c may slide radially outwards in a sliding plate 28 that is mounted in the housing 19. Consequently, the connecting function of the bolt joint system 9 is destroyed which enables displacement of the rear end 2a of the front subframe 2 relative to the vehicle chassis 3.

Figure 4A:
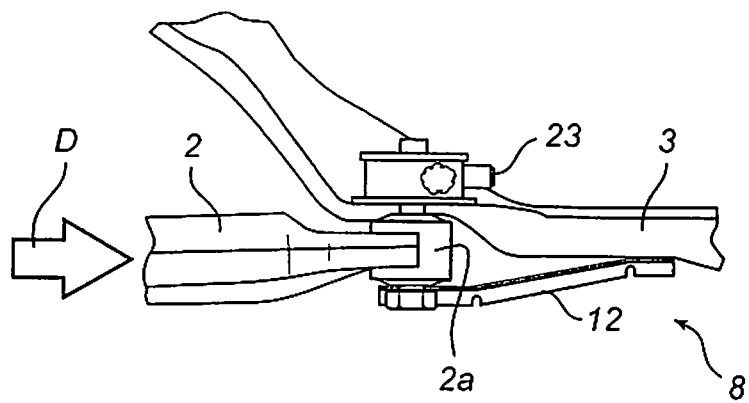
FIG. 4a-c illustrates the function of the connecting device shown in FIG. 2 in a first crash scenario.
Figure 4B:
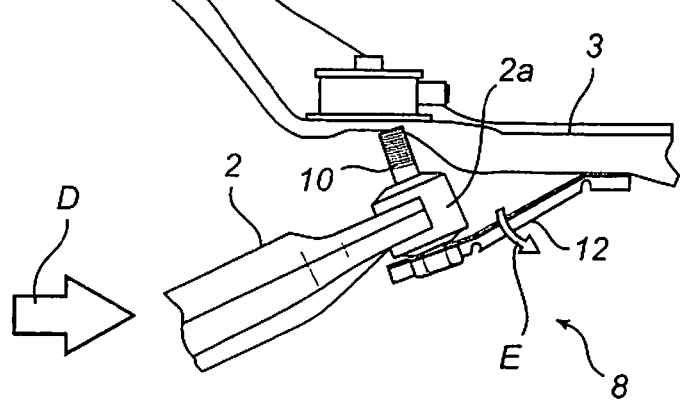
Figure 4C:
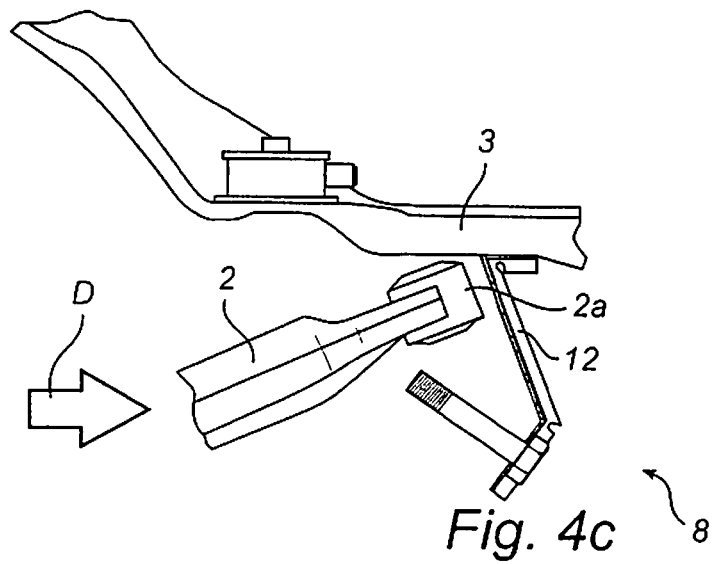

Referring to FIGS. 4a-4c the function of the embodiment described above in a crash scenario will be explained. In this case a frontal impact corresponding to a mid-range speed interval is detected by a crash sensor. In order to reduce the risk of injury to the occupant(s) of the vehicle it is then advantageous to reduce the stiffness of the vehicle front structure 1a by releasing the rear end 2a of the front subframe 2 from the chassis 3. The thereby weakened vehicle front end structure 1a allows the deformation zone 7 to absorb collision energy in a more efficient way as regards the risk of injuries to the vehicle occupant(s).

FIG. 4a shows the connecting device 8 after ignition of the pyrotechnical charge 23. The connecting function is then destroyed as discussed above. Crash forces act on the front subframe 2 in a direction indicated by the arrow D. Due to crash forces transferred from the subframe 2 to the lever arm 12, via the bolt 10, the lever arm 12 is pivoted, as indicated by the arrow E in FIG. 4b. Consequently, the bolt 10 is pulled out from the chassis 3 by means of the lever arm 12. Displacement of the rear end 2a of the subframe 2 relative to the chassis 3 is then enabled and the front subframe 2 is no longer contributing in absorbing collision energy. The robustness of the vehicle front end structure 1a is thus reduced. As mentioned hereinbefore the front subframe 2 may be connected to the chassis 3 also at the front end of the front subframe 2. Those connections may still be in place after the crash, such that the front end of the front subframe 2 is still connected to the chassis 3 after the crash. However, since the rear end 2a of the subframe 2 is disconnected from the chassis 3, displacement of the front subframe 2 relative to the chassis 3 is enabled and thus the stiffness of the vehicle front end structure 1a is reduced. In an alternative embodiment also the two connections at the front end of the front subframe 2 could be connected to the vehicle chassis 3 by means of releasable connecting devices similar to the connecting device 8 described above.

FIG. 4c shows the connecting device 8 at a later stage when the bolt 10 is released from the chassis 3 and the rear end 2a. The rear end 2a of the front subframe 2 is then further displaced relative to the chassis 3.

It is desired to release the front subframe 2 from the chassis 3 as described above in certain specific crash scenarios. The front subframe 2 and/or other structural members, connected to the chassis 3 by means of a connecting device according to an embodiment of the present invention, may be released in crash scenarios such as in frontal, oblique, overlap, side and rear impacts as well as in roll-over events.

As regards frontal impacts the rear end 2a of the front subframe 2 is preferably released in crash scenarios corresponding to a mid range speed interval, such as a relative speed of 30-60 km/h. Especially, the rear end 2a of front subframe 2 is preferably released in crash scenarios corresponding to FMVSS 208 concerning "rigid barrier full frontal crash".

As described the front subframe 2 is connected to the chassis 3 by means of two parallel connecting devices 8, located in the respective side of the subframe rear end 2a, as seen in the transversal direction of the vehicle. In an offset and/or overlap crash scenario it may be advantageously to release only one of the two connecting devices 8 connecting the rear end 2a of the subframe 2 to the chassis 3 to reduce the stiffness of the front end structure on the non-impacted side, in order to adapt the front structure for a more equally distributed deformation of the vehicle front structure 1a.

In several crash scenarios, such as in impacts at low speed or in impacts at high speed it is however not desired to release the subframe 2 from the chassis 3. If such a crash is detected the connecting function is preferably not influenced and is thus maintained throughout the impact event. This is, for instance, the case in low speed crashes, such as crashes at a speed below 10 km/h, since it is then desired to minimize the potential damage to the vehicle structure. Furthermore, in high speed crashes, such as in crashes at a relative speed, between the vehicle 1 and the crash object, above 60 km/h, the more robust structure is desired and therefore the front subframe 2 is preferably also not released. In high-speed crashes the stiffness contribution of the front subframe 2 is needed and the energy absorbed by deformation of the subframe 2 may result in lower loads to the vehicle occupant(s).

A control unit 26 (illustrated in FIG. 2) determines, based on signals received from, for instance, at least one crash sensor, whether the igniter should be activated or not in an impact event. In-crash based crash sensors and/or pre-crash based sensors may be utilized to generate a crash indication signal which is indicative of the severity of a crash. A trigger logic of the control unit 26 that determines whether to send an ignition signal or not in an impact event can be based on the crash indication signal which, for instance, could indicate vehicle speed, delta speed between vehicles, delta speed between the vehicle and a fixed object, acceleration, crash severity or combinations thereof.

The connection between the subframe 2 and the chassis 3 is thus adaptively releasable since a control unit 26 determines, based on the detected crash scenario, whether the connection should be released or not. In contrast to the solution known from JP-11348578, where a structural member is released when a certain force is exceeded, a tailored release of structural member(s) can thus be achieved by using a connecting device 8 according to an embodiment of the present invention.

Figure 5:
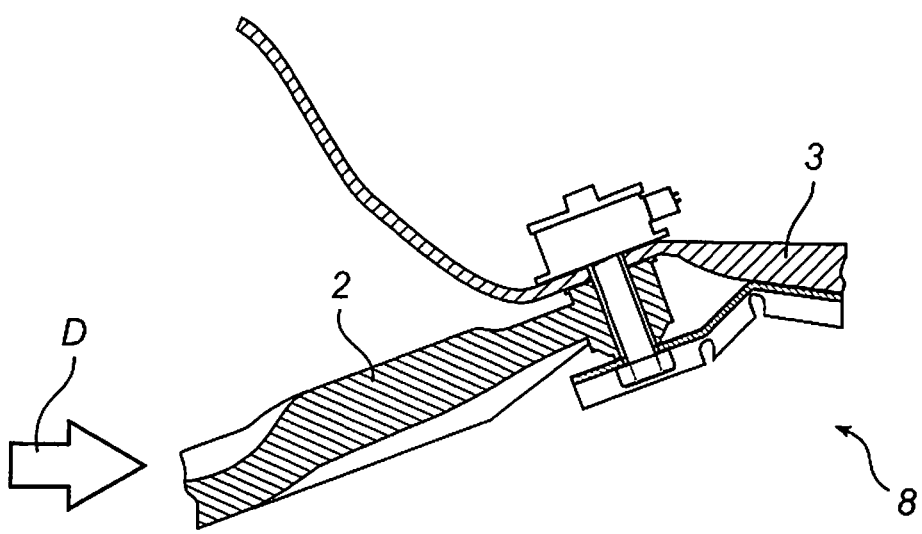
FIG. 5 illustrates the function of the connecting device shown in FIG. 2 in a second crash scenario.

As discussed above, in several crash scenarios it is not desired to release the front subframe 2 from the chassis 3. FIG. 5 shows the connecting device 8 in a high speed crash where it has been determined that it is not advantageous to release the front subframe 2 since the deformation zone 7 need to be supported from the front subframe 2, in order not to deform the space around the occupants, i.e. the passenger compartment 1b. The connecting function of the bolt joint system 9 is in this case maintained throughout the crash event.

It will be appreciated that the described embodiment of the disclosure can be modified and varied by a person skilled in the art without departing from the inventive concept defined in the claims. Example embodiments will now be described more fully with reference to the accompanying drawings.

In the described embodiment a rear end 2a of a front subframe 2 is connected to a vehicle chassis 3 using connecting devices 8. Alternatively or additionally, other structural members of a vehicle 1, such as for instance another type of subframe, a tow hook, a seat structure or a rear axle may be connected to the vehicle chassis 3 using a connecting device according to an embodiment of the present invention.

Furthermore, the lever arm 12 is arranged to pull out the bolt 10 from the chassis 3 after separation of the nut segments 11a, 11b, 11c. In an alternative embodiment, in which the lever arm 12 is excluded, the hole in the chassis 3 may be oversized and/or oval-shaped in order to secure that the bolt 10 is released from the chassis 3. After separation of the nut segments 11a, 11b, 11c the bolt 10 will in this case fall out from the chassis 3.

In a further alternative embodiment the hole in the chassis 3 is extended in a longitudinal direction and forms a guiding groove which is adapted to, after separation of the nut segments 11a, 11b, 11c, allow movement of the bolt 10 in a longitudinal direction. The guiding groove thus enables movement of the bolt 10 although it is not pulled out from the chassis 3.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A connecting device arranged in a motor vehicle for releasably connecting a structural member of the vehicle to the vehicle chassis, the connecting device comprising:
   a bolt joint system no all coupling an end of he structural member to the chassis;
   a pyrotechnical charge; and
   an igniter adapted to detonate the pyrotechnic charge when receiving an ignition signal, the pyrotechnical charge being located near the bolt joint system such that it destroys the connecting function of the bolt joint system upon detonation for releasing the structural member from the chassis such that the chassis is completely disengaged from the end of the structural member.

2. The connecting device according to claim 1, wherein the bolt joint system comprises a bolt, extending through a hole in the structural member and through a hole in the vehicle chassis, and a nut engaging bolt, the nut being adapted to be destroyed by the pyrotechnical charge.

3. The connecting device according to claim 2, further comprising a pulling device, which is operable by crash forces, for pulling out the bolt from at least one of the holes in the structural member and in the vehicle chassis when the connecting function of the bolt joint system is destroyed by the pyrotechnical charge.

4. The connecting device according to claim 3, wherein the pulling device includes a lever arm with a first end fixed to the bolt and a second end pivotally mounted to the chassis.

5. The connecting device according to claim 4, wherein the lever arm has at least one weakened section to enable pivotal movement thereof.

6. The connecting device according to claim 2, wherein the nut includes nut segments retained in engagement with the bolt by a retaining collar.

7. The connecting device according to claim 6, wherein the bolt joint system further comprises a housing in which the nut segments and the retaining collar are arranged.

8. The connecting device according to claim 7, wherein a circumferential channel is formed between the retaining collar and the housing, the circumferential channel being in communication with the pyrotechnical charge.

9. The connecting device according to claim 1, wherein the connecting device is arranged in a motor vehicle for releasably connecting a subframe of the vehicle to the vehicle chassis.

10. The connecting device according to claim 1, wherein the igniter is adapted to receive an ignition signal from a sensor system selected from a group consisting of an in-crash based sensor system and a pre-crash based sensor system.

11. The connecting device according to claim 1, wherein the igniter is adapted to be selectively activated, due to the type of impact.

12. The connecting device according to claim 1, wherein the igniter is adapted to be activated when a relative speed between the vehicle and a detected object is within an interval of 30-60km/h.

13. A method for controlling a connecting device arranged in a motor vehicle for releasably connecting a structural member of the vehicle to the vehicle chassis, the connecting device comprising a bolt joint system, the method comprising:
   generating a crash indication signal based on information from at least one crash sensor;
   comparing the crash indication signal to a first pre-determined value; and
   detonating a pyrotechnical charge if the value of the crash indication signal is above the first pre-determined value, the pyrotechnical charge being located near the bolt joint system such that it destroys the connecting function of the connecting device upon detonation such that detonating the pyrotechnical charge results in completely disengaging the chassis from the structural member.

14. The method according to claim 13, wherein comparing the crash indication signal to a first pre-determined value further comprises comparing the crash indication signal also to a second pre-determined value and detonating the pyrotechnical charge is carried out only if the value of the crash indication signal is above the first pre-determined value and below the second pre-determined value.

15. The method according to claim 13, wherein the crash indication signal is related to the velocity of the vehicle.

16. The method according to claim 10, wherein the sensor system includes an in-crash based crash sensor.

17. The method according to claim 10, wherein the sensor system includes the pre-crash based crash sensor.

18. The method according to claim 10, wherein the ignitor receives the ignition signal from the sensor system only when a relative speed between the vehicle and a detected object is above a first predetermined threshold and below a second predetermined threshold.

19. The method according to claim 13, wherein the at least one crash sensor is an in-crash based crash sensor.

20. The method according to claim 13, wherein the at least one crash sensor is a pre-crash based crash sensor.

21. The connecting device of claim 2, further comprising a lever arm having a fixed end fixed to the chassis and a free end coupled to a head of the bolt, the free end adapted to pivot about the fixed end in response to crash forces transmitted from the structural member and thereby pull the bolt from the chassis.

22. The connecting device of claim 2, wherein the bolt passes through the end of the structural member.

23. The method for controlling a connecting device of claim 13, further comprising a lever arm having a fixed end fixed to the chassis and a free end coupled to a head of the bolt coupling the structural member to the chassis, and wherein the method further comprises pivoting the free end about the fixed end in response to crash forces transmitted from the structural member to thereby pull the bolt from the chassis.

24. The method for controlling a connecting device of claim 23, further comprising completely disengaging the bolt from the structural member by pulling the bolt from the structural member with the lever arm.

* * * * *

UNITED STATES PATENT AND TRADEMARK OFFICE
CERTIFICATE OF CORRECTION

PATENT NO. : 8,532,881 B2  
APPLICATION NO. : 12/498588  
DATED : September 10, 2013  
INVENTOR(S) : Martin Ostling et al.

Page 1 of 1

It is certified that error appears in the above-identified patent and that said Letters Patent is hereby corrected as shown below:

In the Claims

Column 7, Line 66:   "no all"   Should read: --normally--

Column 7, Line 66:   "he"       Should read: --the--

Signed and Sealed this  
Twenty-ninth Day of October, 2013

Teresa Stanek Rea  
*Deputy Director of the United States Patent and Trademark Office*